Nov. 7, 1950     W. H. SALE     2,529,353
BRAKE BEAM SUPPORT

Filed June 10, 1948     5 Sheets-Sheet 1

Inventor
William H. Sale
by Parker & Carter
Attorneys.

Nov. 7, 1950  W. H. SALE  2,529,353
BRAKE BEAM SUPPORT
Filed June 10, 1948  5 Sheets-Sheet 2
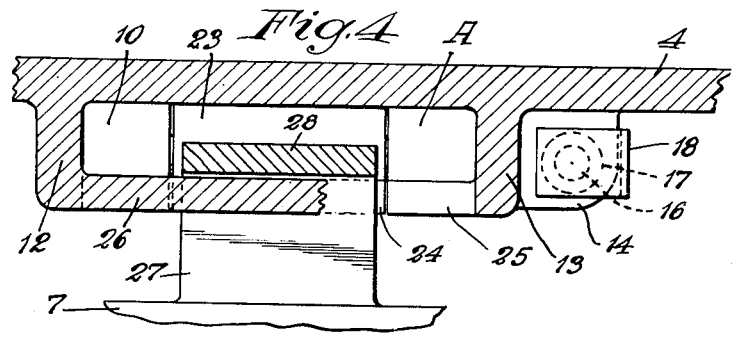
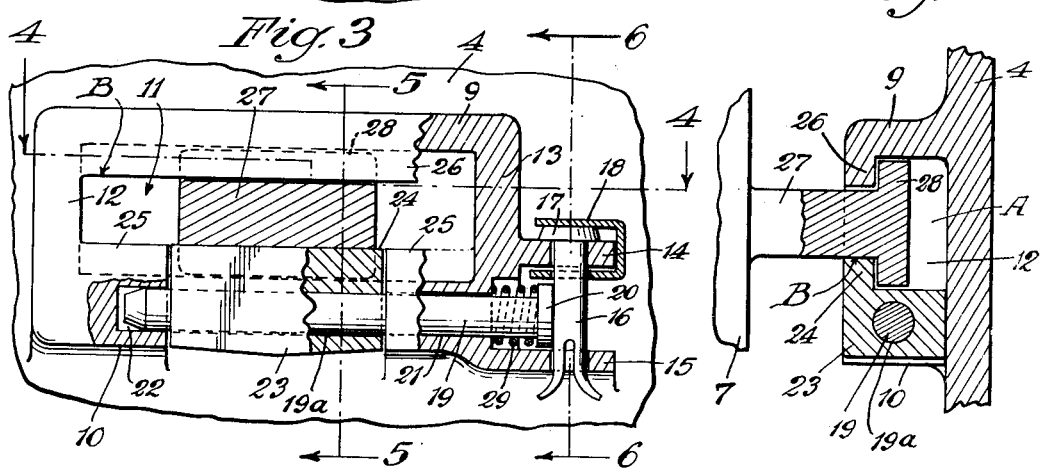
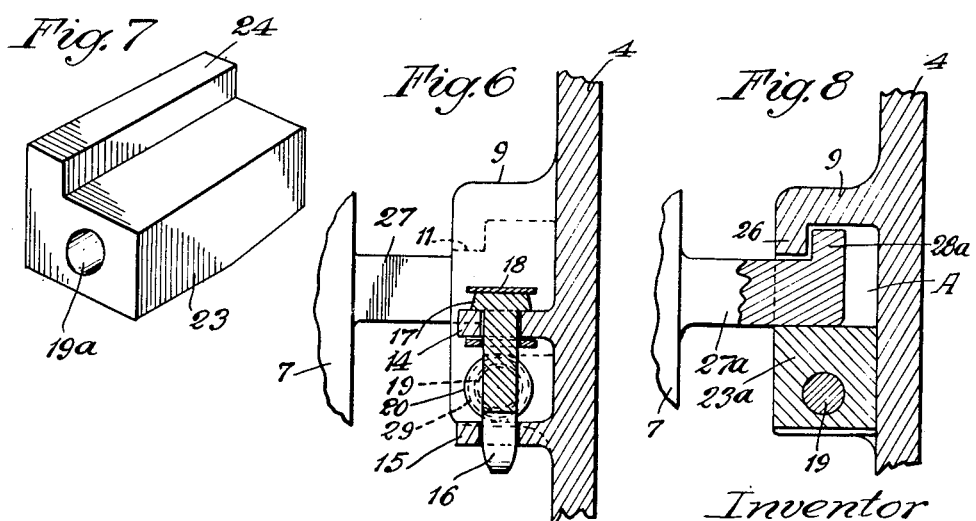
Inventor
William H. Sale
by Parker & Carter
Attorneys

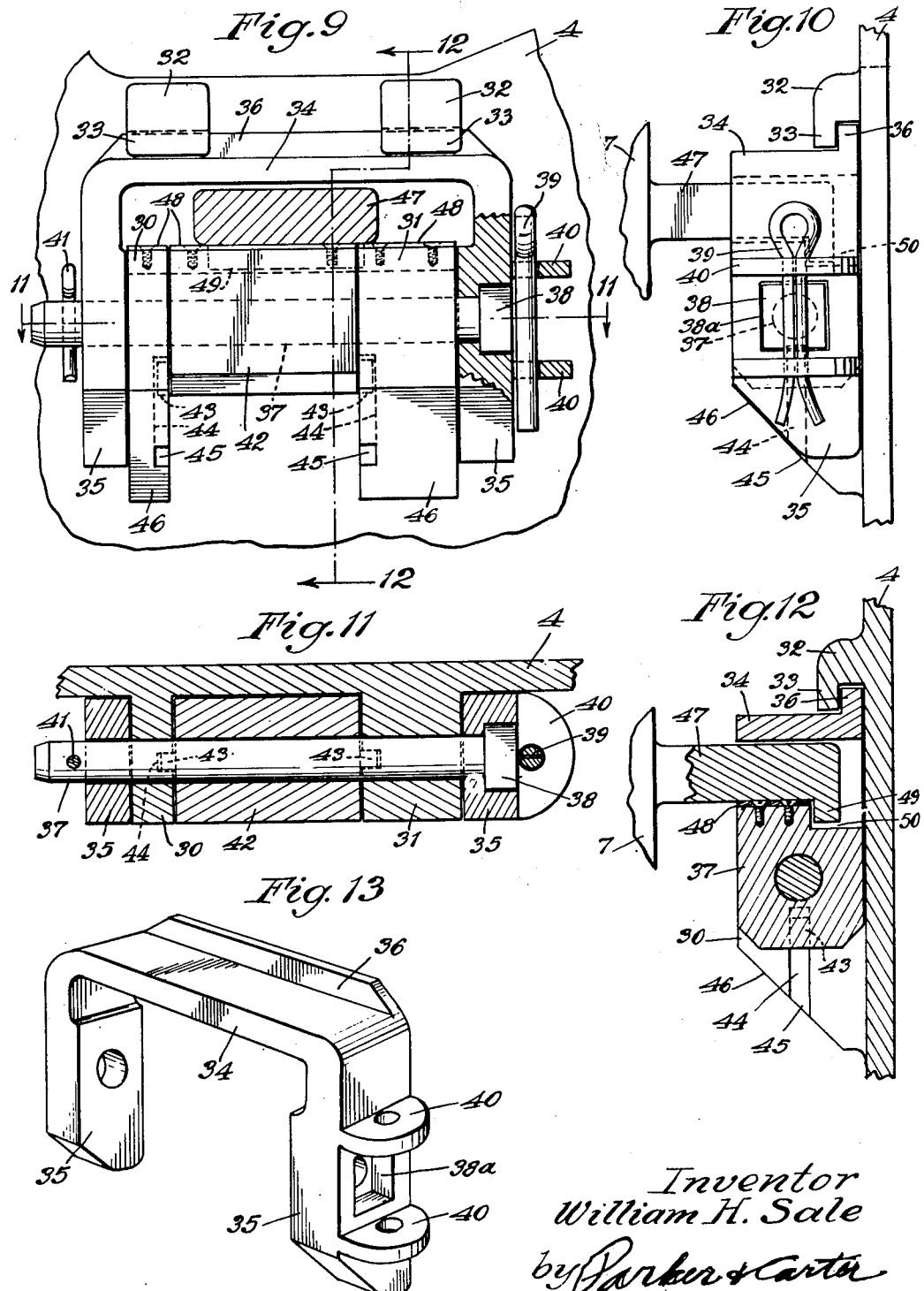

Nov. 7, 1950 W. H. SALE 2,529,353
BRAKE BEAM SUPPORT
Filed June 10, 1948 5 Sheets-Sheet 4
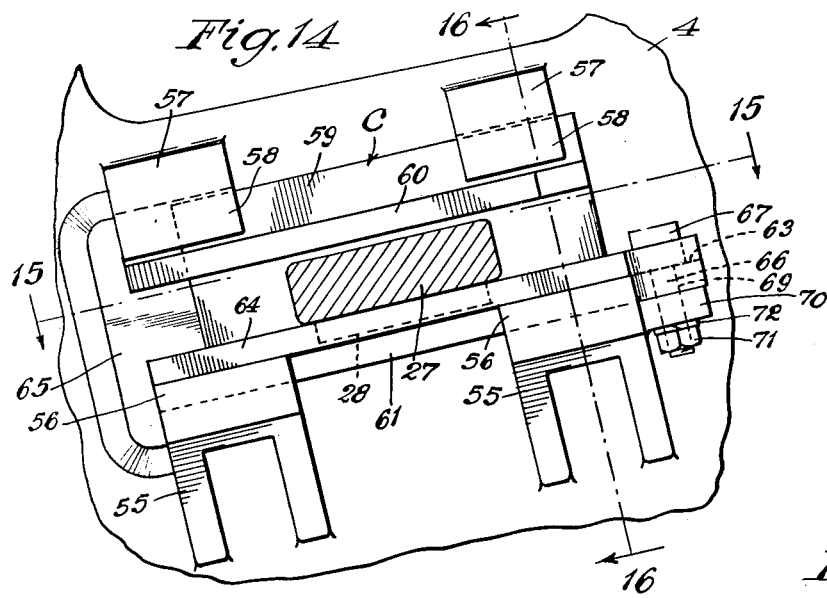
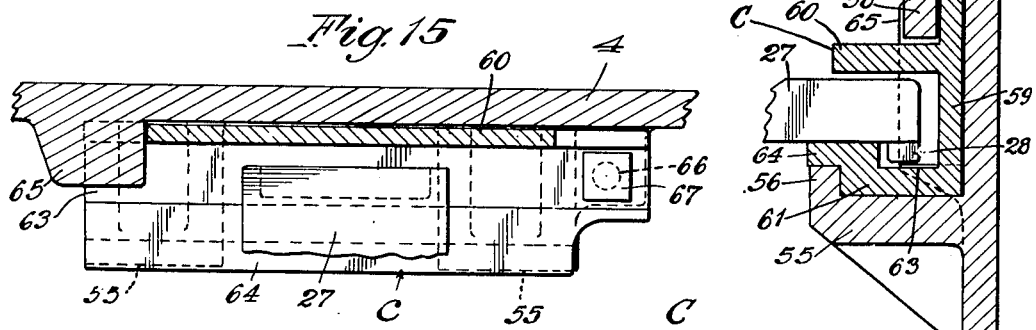
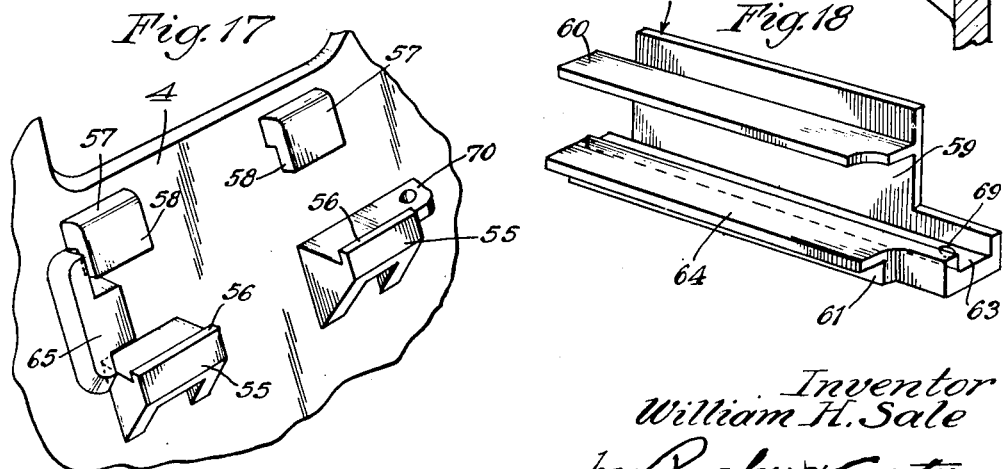
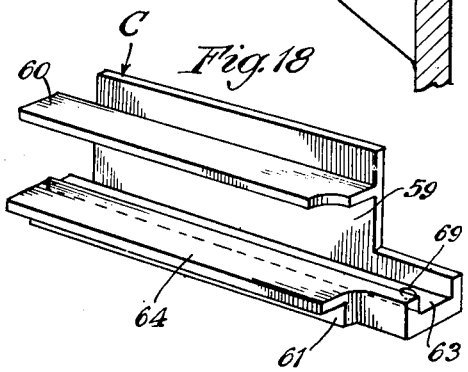
Inventor
William H. Sale
by Parker & Carter
Attorneys Nov. 7, 1950  W. H. SALE  2,529,353
BRAKE BEAM SUPPORT
Filed June 10, 1948  5 Sheets-Sheet 5
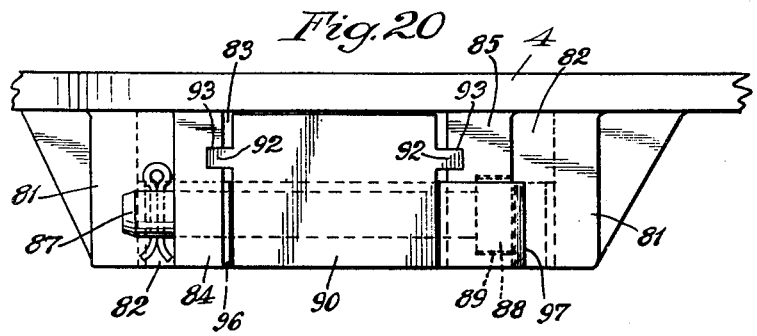
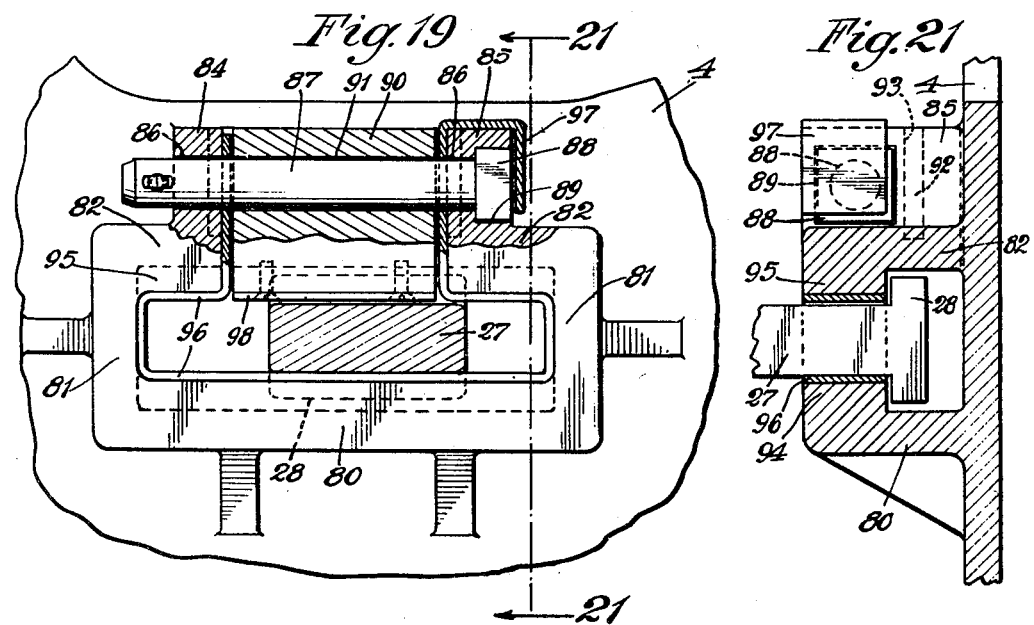
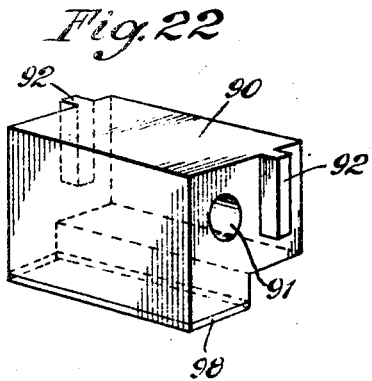
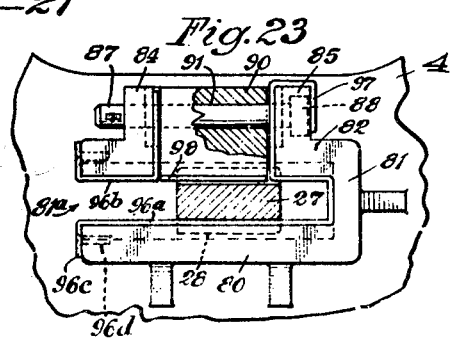
Inventor
William H. Sale
by Parker & Carter
Attorneys Patented Nov. 7, 1950

2,529,353

UNITED STATES PATENT OFFICE 2,529,353

BRAKE BEAM SUPPORT

William H. Sale, Richmond, Va.

Application June 10, 1948, Serial No. 32,151

18 Claims. (Cl. 188—212)

This application relates to the subject matter of applicant's prior co-pending application Serial Number 663,493, filed April 19, 1946.

My invention relates to an improvement in brake beams and brake beam supports. One purpose is to provide improved means for mounting or supporting railroad car brake beams upon the truck frames of the car.

Another purpose is to provide improved means for guiding the movements of brake beams through their braking function.

Another purpose is to provide improved means for permitting ready application of brake beams or removal of brake beams.

Another purpose is to provide improved wear-taking parts for use with brake beams.

Other purposes will appear from time to time in the course of the specification and claims.

I illustrate the invention more or less diagrammatically in the accompanying drawings wherein:

Figure 3 is a section on the line 3—3 of Figure 1, on a larger scale;

Figure 4 is a section on the line 4—4 of Figure 3;

Figure 5 is a section on the line 5—5 of Figure 3;

Figure 6 is a section on the line 6—6 of Figure 3;

Figure 7 is a perspective view of a detail;

Figure 8 is a section similar to Figure 5 through a variant form;

Figure 9 is a section similar to Figure 3, of a variant form;

Figure 10 is an end elevation of the structure of Figure 9;

Figure 11 is a section on the line 11—11 of Figure 9;

Figure 12 is a section on the line 12—12 of Figure 9;

Figure 13 is a perspective view of a detail of the structure shown in Figures 9 to 12;

Figure 14 is a view, similar to Figure 9, of another form of the invention;

Figure 15 is a section on line 15—15 of Figure 14;

Figure 16 is a section on line 16—16 of Figure 14;

Figure 17 is a perspective of part of the frame shown in Figure 14;

Figure 18 is a perspective of a removable part shown in Figure 14;

Figure 19 is a view, similar to Figure 14, through another form of the invention;

Figure 20 is a top plan view of the structure of Figure 19;

Figure 21 is a section on the line 21—21 of Figure 19;

Figure 22 is a perspective of a detail shown in Figure 20; and

Figure 23 is an elevation, with parts in section, of a modification of the structure shown in Figure 19.

Like parts are indicated by like symbols throughout the specification and drawings.

Figure 1:
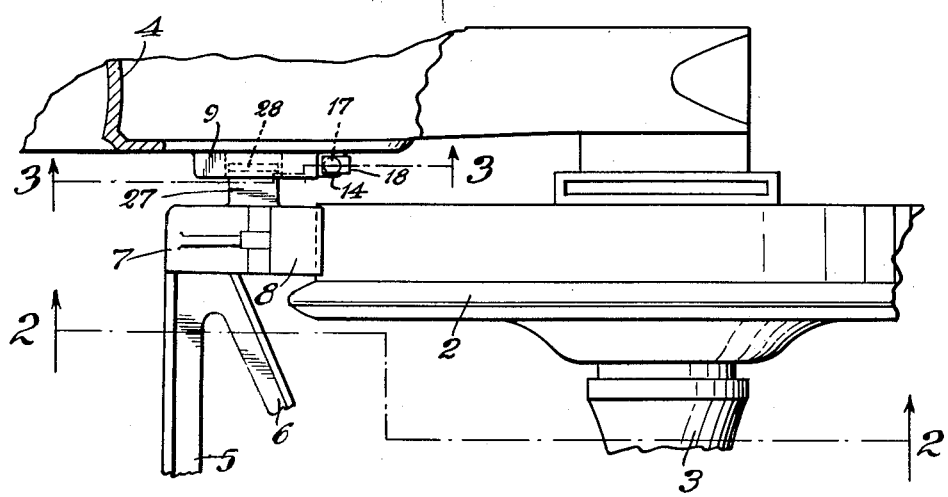
Figure 1 is a plan view with parts in section illustrating one end of a brake beam and a guiding connection between it and the car truck side frame.
Figure 2:
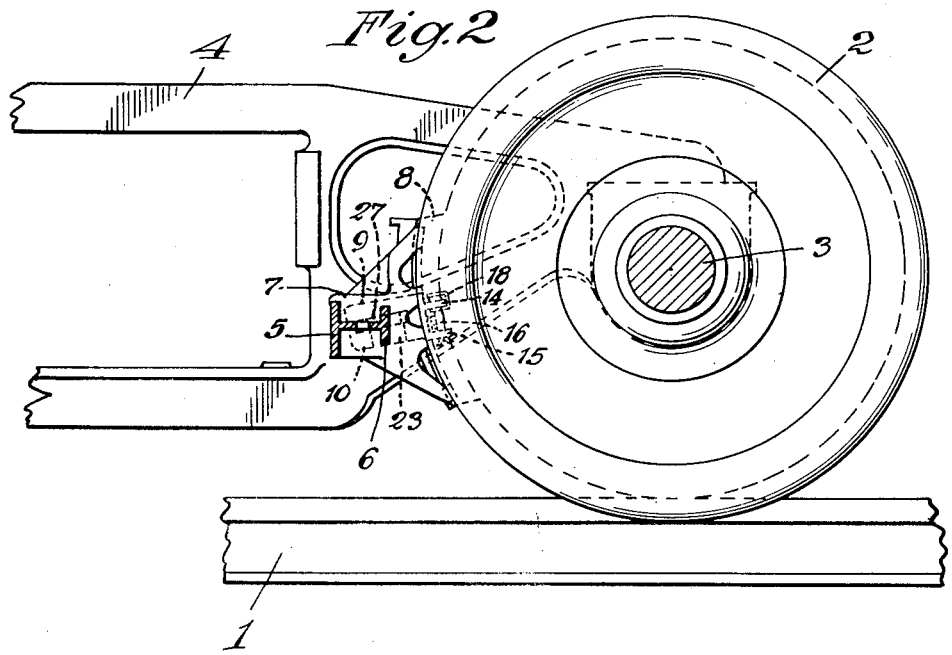
Figure 2 is a section on the line 2—2 of Figure 1, on a slightly reduced scale.

Referring to the drawings, and referring, first, to Figure 2, 1 illustrates the track rail, and 2 a flanged track wheel with its axle 3. 4 indicates any suitable truck side frame. 5, 6 indicate the components of a truss type brake beam. 7 is any suitable brake head in which may be positioned any suitable brake shoe 8. The side frame 4, as will appear, for example, in Figures 3 and 5, is provided with upper and lower flanges 9 and 10. The flanges are shown as defining between them a T-shaped aperture 11. The flanges 9 and 10 are connected at their ends by upright portions 12 and 13. From the end portion 13 project an upward ear 14 and a lower ear 15, apertured to receive a cotter 16, the head of which, 17, may be held downwardly against the upper surface of the ear 14 by any suitable retaining washer 18. When the parts are in the position in which they are shown in Figure 3, the cotter 16 retains the locking pin 19 with its head 20. The locking pin penetrates aligned apertures 21 and 22, and closes the bottom of the T-shaped opening by means of a shoe 23, through which it passes. The shoe 23 includes an upwardly extending flange 24 which aligns with corresponding flanges 25 on the upper portion of the frame member or members 10. The upper frame member 9 also has a downwardly extending flange 26.

The result is that a relatively large space, which I may indicate at A in Figure 5, is provided, which has, communicating with it, a relatively narrow front slot B through which may pass the supporting lug 27 of the brake beam structure. The supporting lug 27 terminates in an enlarged portion 28, which is thin and is retained by the flanges 24, 25 and 26, as will be clear from Figures 3, 5 and 7. I illustrate a coil spring 29 which normally urges the head 20 of the retaining or locking pin 19 against the cotter 16, and which insures that the head 20 will be accessible for the ready withdrawing of the pin 19 when the cotter pin 16 is removed.

In the use of the device it will be understood that when the operator wishes to remove the brake beam structure he first removes the cotter 16, after removal of the retainer 18, thereafter withdraws the pin 19 from the receiving aperture 19a of the block 23, and downwardly removes the block 23. This opens a space of sufficient length, between the flanges 25, to permit the ready downward movement of the brake beam supporting lug 27, 28. It will be understood that an identical structure is used at each side of the vehicle.

Referring to Figure 8, I illustrate a variation of the structure of Figures 3 to 7, in which a block 23a is used, and from which the flange 24 of Figure 5 is omitted. The brake beam supporting lug 27a has an upward enlargement 28a, but has a plane bottom side continuous with the bottom of the beam supporting lug 27a.

With reference to the form of Figures 9 to 13, I illustrate a different variation or adaptation of my invention. The side frame has spaced bottom supports 30, 31 and top retaining lugs 32, each top retaining lug having a downwardly extending ear or holding portion 33 spaced outwardly from the frame portion 4. Between the bottom members 30 and 31 and the top members 32 is positioned a removable U-shaped guiding block, generally indicated as 34, and having downwardly extending end arms 35 which, between them, embrace the supports 30 and 31. The member 34 also has an upwardly extending flange 36 which is received rearwardly of the portions 33 of the upper holding members or lugs 32. The side arms 35 and the lower supports 30 and 31 are all apertured in alignment to receive a locking pin 37 headed, as at 38, and held in position, for example, by a cotter 39 which passes through apertured, vertically aligned ears 40 extending from one of the end arms 35 of the member 34. An additional cotter pin 41 may, if desired, be used at the opposite end of the pin 37. The pin 37 passes through and supports a removable center block 42, which is provided with guiding keys 43 which ride in vertical slots 44, the lower ends of which are open as at 45 in the inclined bottom surfaces 46 of the members 30 and 31.

It will be understood that when the parts are in the position in which they are shown in Figure 9, a suitable space is provided to receive the supporting end portion 47 of the brake beam. It may rest, for example, on one or more removable wear-taking elements 48, as shown in Figures 9 and 12. It has a downwardly extending enlargement 49 received in an aperture or recess 50 at the rear of the block 37, the members 30 and 31 being similarly formed. Thus I provide a guiding support for a brake beam, which includes a removable bottom block 37 which, when withdrawn, permits the brake beam projection or lug 47 to pass between the bottom supporting members 30 and 31. The guiding structure 34 is also removable by merely lowering it and slipping it forwardly from beneath the projections 33 of the upper supports 32. Note that the head 38 of the pin 37 may be square, and may be received in a corresponding squared recess 38a, as shown, for example, in Figure 13.

Referring to the form of Figures 14 to 18, the frame element 4 has inwardly projecting lower supports or lugs 55, with their upper, inner flanges 56 and upper supports or lugs 57, with their lower, inner flanges 58. Positioned in the space thus formed, I provide the removable guide and support, indicated in perspective in Figure 18. It includes the rear plate or portion 59, an upper, inwardly extending flange 60, and a lower flange 61. The lower flange 61 is downwardly reduced, to provide a space or channel 63 shown as open at the right end, referring to the position of the parts as shown in Figure 18. The lower flange 61 is also provided with an inwardly extending upper flange portion 64 which rests upon the flanges 56 of the lugs 55.

The structure of Figure 18 is limited in its movement, in one direction, by a stop element 65, the position of which will be evident, for example, in Figure 17. Assuming that the guide member which, for convenience, may be generally described as C, is slipped into the position in which it is shown in Figures 14 and 16, its movement in one direction is prevented by an inserted bolt 66. Its head 67 rests on the bottom of the slot 63, and it passes through the aperture 69 and then through an apertured ear 70 which extends laterally from one of the bottom supports 55. Thus the guide C is locked in fixed position. The bolt 66 may be retained by any suitable nut 71 and lock washer 72. The head 67 limits endwise movement of the brake beam lug 27 which, however, will not normally move that far. In order to insert the brake beam, the member C must be removed and it is put back into place after the lugs 27 are in the position illustrated in Figure 14. In order to remove the brake beam, it is necessary to remove the bolt 66, whereupon the member C may be moved out of position. It will be clear from the drawings that the brake beam may be removed either downwardly or upwardly between the lower lugs 55 or the upper lugs 57.

Referring to the form of Figures 19 to 22, the structure is generally the same as that of the form of Figures 4 to 7, but the closure block is upwardly instead of downwardly removable. The truck frame member 4 has projecting from it a bottom flange 80, end flanges 81, and top flanges 82, separated by a space 83 and having upward extensions 84, 85. The extensions 84, 85 have aligned apertures 86 to receive a locking pin 87 with its square head 88 received in a corresponding aperture 89 in the upwardly extending portion 85. The pin 87 holds a locking block 90 in position, passing through the aperture 91. The block 90 has end keys 92 received in slots 93 in the members 84, 85. As will be clear, for example, in Figures 21 and 22, the bottom flange 80 has an upwardly extending portion 94, and the upper flanges 82 have correspondingly downwardly extending portions 95. These may serve as bearing surfaces for the brake beam supporting flange 27 with its inner enlargement 28, but are shown as covered by a removable wear-taking and locking liner 96, one end of which, as at 97, may be bent into position to retain the head 88 of the pin 87 in the aperture 89. The block 90 is shown as having a removable wear-taking bottom member 98.

It will be understood that when the user wishes to remove the brake beam, he first removes the pin 87, then the block 90, and, thereafter, the brake beam supporting lug 27 may be upwardly lifted through the gap between the members 84 and 85.

Referring to Figure 23, the structure is substantially as shown in Figure 19, except that one side wall 81 is broken away to leave an opening, indicated at 81a, and the member 96 is separated into two separate members 96a and 96b, having end flanges 96c secured by screws 96d.

The use and operation of the invention are as follows:

I provide a structure, of which various forms are shown, in which a brake head 7 is slidably supported on a side frame 4, with provision for ready removal. Referring, for example, to Figures 3, 4 and 5, the brake head 7 has an outwardly extending part 27 with an enlargement 28 which interlocks with an inward extension from the side frame 4. A limited longitudinal sliding movement is permitted, as will be clear from Figures 3 and 4, and also a limited transverse sliding movement, as will be clear from Figure 5. The brake beam may readily be removed by withdrawing a removable block 23 which constitutes part of the lower confining surface, and has a portion 24 which forms part of the limiting flange defining the narrow entrance space B. Other forms illustrate other methods of permitting ready removal of the brake beam.

In the structure as shown in Figures 3 to 7 the block 23 is normally held in position by the longitudinally removable pin 19. It, in turn, is locked in position by the cotter 16, which is also provided with a securing clip 18.

In Figure 8 I illustrate a form in which I dispense with the lower extension of the enlargement 28 on the portion 27 which extends outwardly from the brake beam structure.

In Figures 9 to 13 I illustrate a form in which the upper confining flange, the member 34, may be removed.

In Figures 14 to 18 I illustrate a form in which both the upper and lower confining flanges, and their connecting portion, as shown at 59, 60 and 61, may bodily be removed, but are normally supported within integral lugs 55 and 57. The entire guiding structure may be endwise removed when the pin 66 is released.

Figure 20 and following illustrate further variations.

All forms of my invention have it in common that in a brake beam supporting connection between a truck side frame and a brake head there are flanges on the truck side frame, either integral with it or removable from it, which define a longitudinally extending and generally horizontal channel having an inner portion of greater height than the opening of the channel. Into the channel thus formed a brake head supporting member extends, in supporting relation with the brake head, and in sliding but interlocking relation with the channel. In some forms the brake head may be upwardly removed, and in some forms it may be downwardly removed; but in all forms I provide for a readily removable element or elements which permits a quick separation between the brake head and the truck side frame.

The forms in which the beam can be removed through the top plate have the advantage that the beam may be removed without jacking the car, preventing the necessity of dismantling and removing parts of the truck to make the application. In such case the truck springs and spring plank need not be removed.

I claim:

1. In a brake beam supporting connection between a truck side frame and a brake head, flanges on the truck side frame defining a longitudinally extending and generally horizontal channel having an inner portion of greater height than the opening of the channel, and a brake head supporting member in supporting relation with said brake head, including a portion having an end enlargement extending into and slidable along said channel, at least one of said flanges having a removable portion of a length sufficient, when said portion is removed, to permit the passage of said brake head supporting member through said flange.

2. The structure of claim 1, characterized by and including the provision of a removable block having a face which assists in defining said horizontal channel.

3. The structure of claim 1, characterized by and including a removable block having a portion forming part of a lower flange of said horizontal channel.

4. The structure of claim 1, characterized by and including the provision of a removable block having a face which assists in defining said horizontal channel, and a longitudinally extending pin passing through said block and having end portions extending into fixed portions of said horizontal channel, between which said block is positioned.

5. The structure of claim 1, characterized by and including a channel structure in which upper and lower portions are bodily removable from the truck side frame.

6. The structure of claim 1, characterized by and including a removable block having a portion forming part of an upper flange of said horizontal channel.

7. The structure of claim 1, characterized by and including a wear taking, removable liner for an outer portion of said horizontal channel.

8. The structure of claim 1, characterized by and including a removable block having a portion forming part of said horizontal channel, a wear taking, removable liner for an outer portion of said horizontal channel, and a unitary securing means for securing said block and said liner in operative position.

9. The structure of claim 1, characterized by and including closure portions for both ends of said channel.

10. The structure of claim 1, characterized by and including a closure portion for one end of said channel, the other end of said channel being open.

11. In a brake beam supporting connection between a truck side frame and a brake head, a multiple flange structure on the truck side frame including fixed and removable portions forming a longitudinally extending and generally horizontal channel having an inner portion of greater height than the opening channel, and a brake head supporting member in supporting relation with said brake head, including a portion having an end enlargement extending into and slidable along said channel, said flange structure including a removable flange element and including fixed portions separated by a space sufficient, when said element is removed, to permit the removal of said brake head supporting member along a path generally perpendicular to its path along said horizontal channel.

12. The structure of claim 11 characterized by and including a channel structure bodily removable from the truck side frame.

13. The structure of claim 11 characterized by and including a bodily removable channel liner and supports therefor, inwardly extending from the truck side frame.

14. The structure of claim 11 characterized by and including a bodily removable channel liner and supports therefor formed and adapted to permit endwise removal of the liner.

15. The structure of claim 11 characterized by and including a bodily removable channel liner and supports therefor, inwardly extending from the truck side frame, said supports having a gap substantially of sufficient width to permit the downward movement of the brake head supporting member when the channel liner is removed.

16. The structure of claim 11 characterized by and including integral channel lugs on the truck side frame, a bodily removable channel liner slidable endwise therealong, and a locking connection between said channel liner and the truck side frame.

17. The structure of claim 11 characterized by and including integral channel lugs on the truck side frame, a bodily removable channel liner slidable endwise therealong, and a locking connection between said channel liner and the truck side frame, a pair of said lugs being separated by a distance sufficient to permit movement therebetween of the brake head supporting member when the channel liner is removed.

18. The structure of claim 11 characterized by and including a bodily removable channel liner slidable along the truck side frame, stop means for limiting its movement in one direction, and a locking connection between the channel liner and the truck side frame, adapted to prevent its movement in the other direction.

WILLIAM H. SALE.

REFERENCES CITED

The following references are of record in the file of this patent:

UNITED STATES PATENTS

| Number | Name | Date |
|---|---|---|
| 2,254,513 | Busse | Sept. 2, 1941 |
| 2,254,514 | Busse | Sept. 2, 1941 |
| 2,282,558 | Busch | May 12, 1942 |

FOREIGN PATENTS

| Number | Country | Date |
|---|---|---|
| 213,943 | Great Britain | Apr. 7, 1924 |